United States Patent
Magoto et al.

(10) Patent No.: US 9,809,434 B2
(45) Date of Patent: Nov. 7, 2017

(54) CART/PALLET SYSTEM (71) Applicant: Crown Equipment Corporation, New Bremen, OH (US)

(72) Inventors: Daniel C. Magoto, Russia, OH (US); Daniel W. Kahlig, Fort Recovery, OH (US); Steven R. Pulskamp, New Bremen, OH (US); Benjamin J. Purrenhage, Kalamazoo, MI (US); Mark J. Sherman, Hudsonville, MI (US)

(73) Assignee: Crown Equipment Corporation, New Bremen, OH (US)

( * ) Notice: Subject to any disclaimer, the term of this patent is extended or adjusted under 35 U.S.C. 154(b) by 437 days.

(21) Appl. No.: 14/458,485

(22) Filed: Aug. 13, 2014

(65) Prior Publication Data
US 2015/0048288 A1 Feb. 19, 2015

Related U.S. Application Data (60) Provisional application No. 61/865,805, filed on Aug. 14, 2013.

(51) Int. Cl.
*B66F 9/08* (2006.01)
*B66F 9/12* (2006.01)
(Continued)

(52) U.S. Cl.
CPC ............ *B66F 9/087* (2013.01); *B62B 3/0618* (2013.01); *B65D 19/0018* (2013.01); *B66F 9/12* (2013.01);
(Continued)

(58) Field of Classification Search
CPC ...... B66F 9/12; B66F 9/06; B66F 9/10; B66F 9/18; B66F 9/20; B66F 17/006;
(Continued)

(56) References Cited

U.S. PATENT DOCUMENTS 2,675,139 A * 4/1954 Mercier .................... B66F 9/12
414/607
5,810,117 A * 9/1998 Wood ....................... B65G 1/07
187/244

(Continued)

FOREIGN PATENT DOCUMENTS

CA 2309843 * 5/2000
CA 2309849 A1 11/2001
(Continued)

OTHER PUBLICATIONS

2,200lb Capacity Power Drive Stacker, Wesco Pallet Trucks, Pallet Truck Stacker.*
(Continued)

*Primary Examiner* — Larry E Waggle, Jr.
*Assistant Examiner* — Mahdi H Nejad
(74) *Attorney, Agent, or Firm* — Stevens & Showalter, LLP (57) ABSTRACT

An improved cart and pallet system and an improved compactly stackable pallet for use in the system are disclosed. The improved pallet has a central support extending beneath the pallet with channels on either side of the support. The support and channels are engaged by a ledged, generally U-shaped deck of a cart or pallet truck of the application.

13 Claims, 7 Drawing Sheets

(51) Int. Cl.
*B62B 3/06* (2006.01)
*B65D 19/00* (2006.01)
*B66F 9/06* (2006.01)

(52) U.S. Cl.
CPC ............... *B62B 2203/20* (2013.01); *B65D 2519/00034* (2013.01); *B65D 2519/00069* (2013.01); *B65D 2519/0096* (2013.01); *B65D 2519/00288* (2013.01); *B65D 2519/00338* (2013.01); *B66F 9/06* (2013.01)

(58) Field of Classification Search
CPC ........ B66F 9/22; B66F 9/087; B66B 2203/10; B65D 2519/00034; B65D 2519/00069; B65D 2519/00288; B65D 2519/00338; B65D 19/0018; B65D 2519/0096; B62B 3/0618; B62B 2203/20
USPC ............... 414/607, 785, 608, 814, 664, 490; 280/43.12; 254/2 C, 8 C, 2 B, 93 R, 254/89 H; 108/53.1, 57.17, 53.3, 57.21, 108/57.33, 51.3; 187/237, 409, 231, 222, 187/223, 233; D34/38; 206/386; 269/17
See application file for complete search history.

(56) References Cited

U.S. PATENT DOCUMENTS

| | | | | |
|---|---|---|---|---|
| 6,035,972 A | * | 3/2000 | Beattie | B66F 9/06 187/231 |
| 8,282,111 B2 | * | 10/2012 | Hailston | B62B 3/0618 280/43.12 |
| 8,360,443 B2 | * | 1/2013 | Ellington | B62B 3/0612 187/224 |
| D725,338 S | * | 3/2015 | Pulskamp | D34/34 |
| D729,488 S | * | 5/2015 | Pulskamp | D34/38 |
| 2007/0210542 A1 | * | 9/2007 | Hammond | B62B 3/008 280/43.12 |
| 2008/0164101 A1 | * | 7/2008 | Stone | B66F 9/06 187/231 |
| 2011/0243696 A1 | * | 10/2011 | DiBenedetto | B66F 9/06 414/490 |
| 2012/0319063 A1 | | 12/2012 | Hailston et al. | |
| 2014/0034424 A1 | * | 2/2014 | Zuckerman | B66B 9/16 187/240 |
| 2016/0368747 A1 | * | 12/2016 | O'Connell | B62B 3/0618 |

FOREIGN PATENT DOCUMENTS

| | | |
|---|---|---|
| DE | 9205223 U1 | 6/1992 |
| DE | 102010051869 A1 | 5/2012 |
| GB | 529605 A | 11/1940 |
| GB | 2190063 * | 3/1987 |

OTHER PUBLICATIONS

International Search Report and Written Opinion; PCT Patent Application No. PCT/US2014/050819; dated Mar. 3, 2015; European Patent Office.

* cited by examiner

CART/PALLET SYSTEM

FIELD OF THE INVENTION

The disclosure of the present application relates generally to pallet trucks and more particularly to a pallet truck and corresponding pallet system.

BACKGROUND OF THE INVENTION

Pallet trucks can be hand or power driven and are the most common materials handling vehicles in use today. These trucks are used in a wide variety of businesses involved in product manufacturing, distribution, retailing—generally any business where large products or large packages of products need to be moved around a facility. While larger materials handling vehicles are also commonly used in many of these facilities, in smaller facilities, such as grocery and convenience retail stores, pallet trucks that are manually pulled and pushed, referred to as hand pallet trucks or carts, and powered versions of hand pallet trucks may be all that is available.

A primary purpose for pallet trucks as the name implies, is to enable people to move heavy, palletized product loads over relatively short distances. For example, they are used to load and unload pallets from semitrailers, to move heavy loads around a facility, to transport products to retail sales floors, to support products while they are placed on shelves for display and similar tasks. Accordingly, pallet trucks help businesses function and facilitate their operations.

SUMMARY OF THE INVENTION

The present application teaches an improved cart and pallet system and an improved compactly stackable pallet for use in the system. The improved pallet has a central support extending beneath the pallet with channels on either side of the support. The support and channels are engaged by a ledged, generally U-shaped deck of a cart or pallet truck of the application.

DETAILED DESCRIPTION OF THE INVENTION

Figure 1:
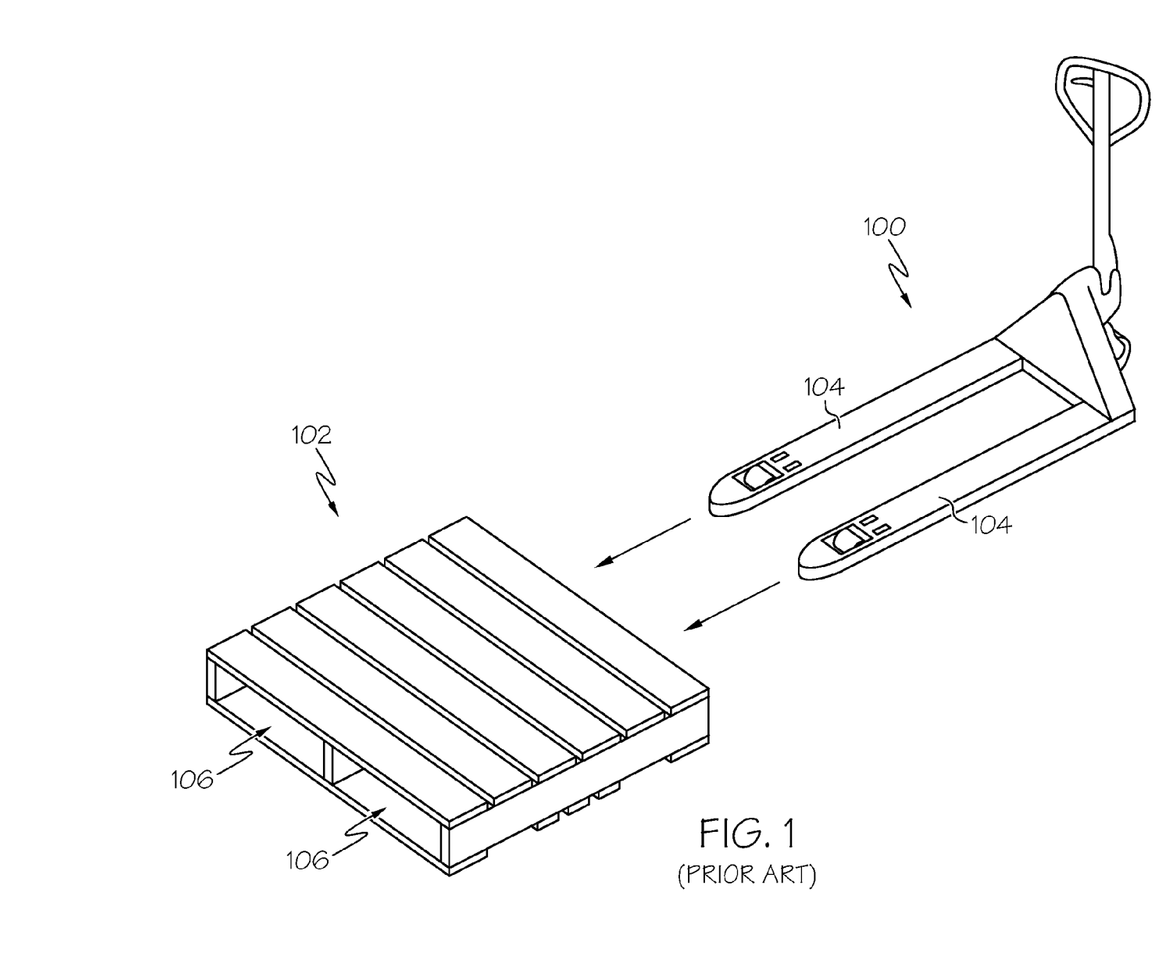
FIG. 1 illustrates a conventional hand pallet truck and wooden pallet.

Reference is made to FIG. 1 which illustrates a conventional hand pallet truck 100 for moving common pallets, illustrated by a wooden pallet 102, by means of inserting forks 104 of the truck 100 into openings 106 of the pallet 102. While such hand pallet trucks and pallets continue to be widely used, in some industries more specialized material handling systems are appearing.

For example, some delivery systems for the beverage industry use half pallets which facilitate operations within very narrow aisles often encountered in convenience retail stores. An example of one such system is disclosed in U.S. Pat. No. 8,282,111 and US Published Patent Application No. 2012/0319063 wherein a platform is raised and lowered relative to a cart using a pair of spaced hydraulic cylinders. A foldable linkage connects to spaced-apart locations along the platform and a frame to provide controlled and balanced movement of the platform relative to the cart. The delivery systems disclosed in US '111 and USPA '063 include pallet retention features wherein projections are provided on either the platform or a pallet and apertures or recesses are provided on either the pallet or the platform so that when the pallet is on the platform, the projections enter the apertures or recesses to retain the pallet to the platform.

Another example of a beverage delivery system includes pallets that have support legs which are displaced inwardly from the side edges of the pallets by a distance so that the legs can be received within the space between forks of a pallet truck, such as the forks 104 of the truck 100. In this system, pallets are retained and prevented from moving laterally on a pallet truck by the pallet legs and truck forks.

Figure 2:
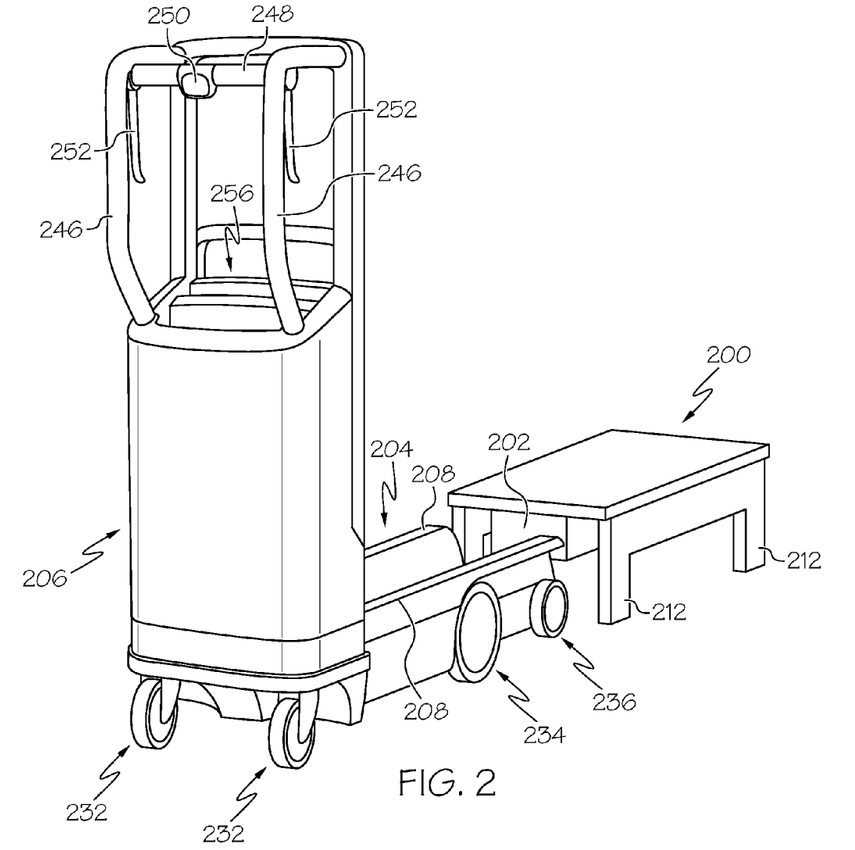
FIG. 2 illustrates an improved pallet truck or cart and pallet system of the present application.
Figure 2A:
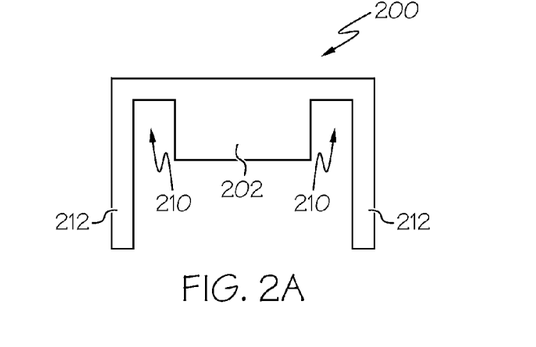
FIG. 2A illustrates a pallet having a central support extending beneath the pallet of the present application.

In the present application, FIG. 2 illustrates an improved pallet truck and pallet system, which may be referred to as a cart and pallet system. FIG. 2A shows a pallet 200 having a central support 202 extending beneath the pallet 200 which is engaged by a generally U-shaped deck 204 of a pallet truck or cart 206. The U-shaped deck 204 has ledges 208 that extend outwardly along the upper edges of the deck and are received within channels 210 that extend along either side of the central support 202.

Figure 3:
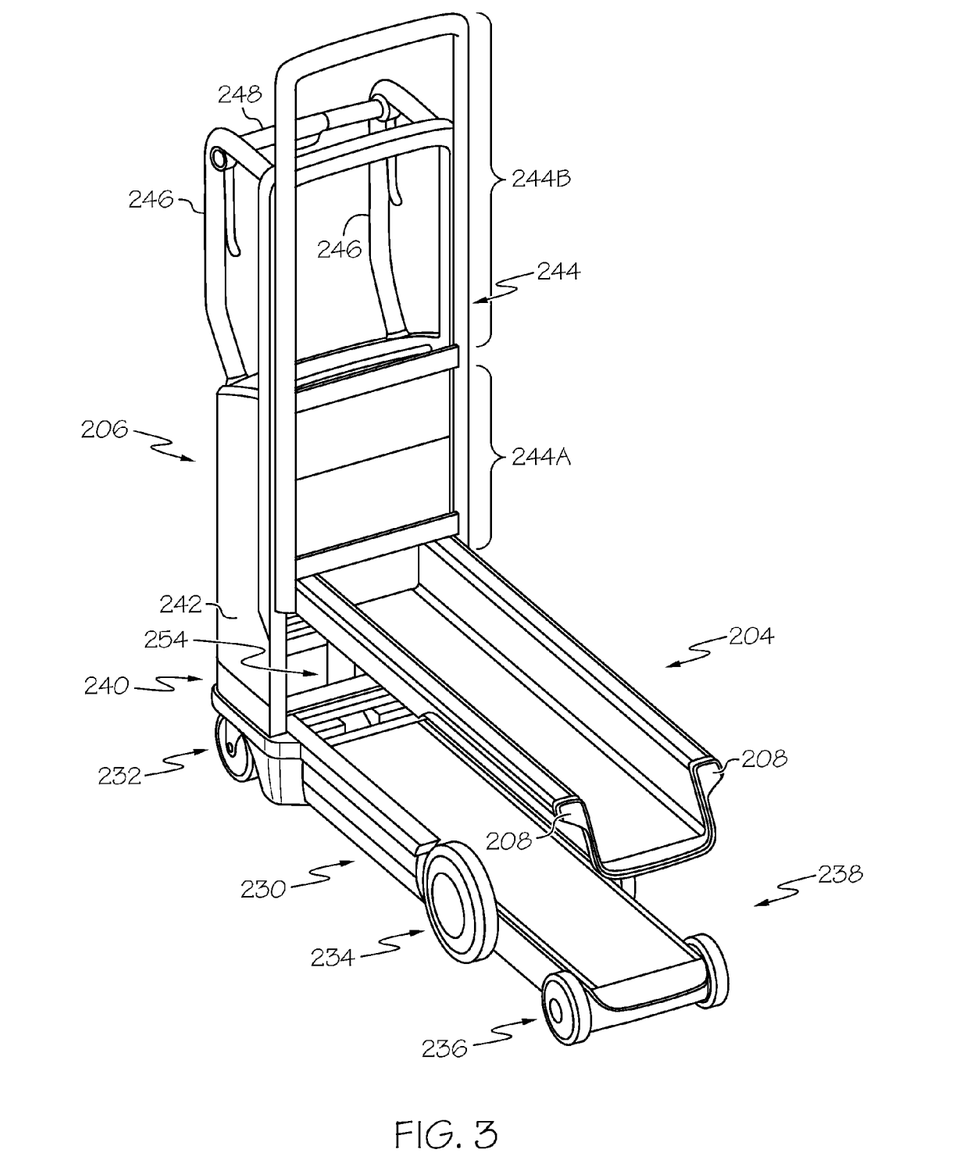
FIG. 3 illustrates an improved pallet truck or cart having its pallet supporting deck raised.
Figure 4:
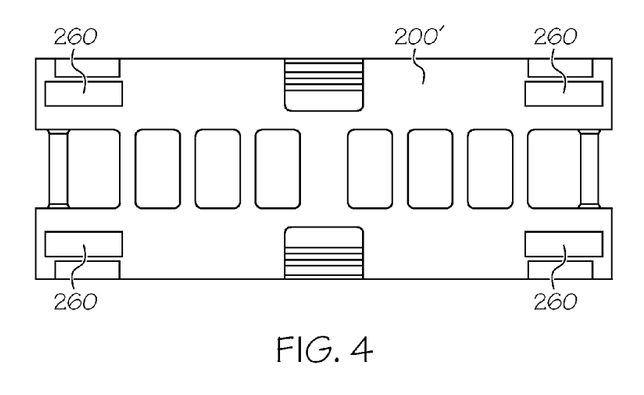
FIGS. 4-9 illustrate a preferred design for a pallet for use with the pallet truck or cart of the present application.
Figure 5:
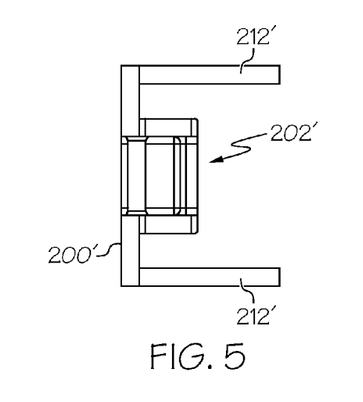
Figure 6:
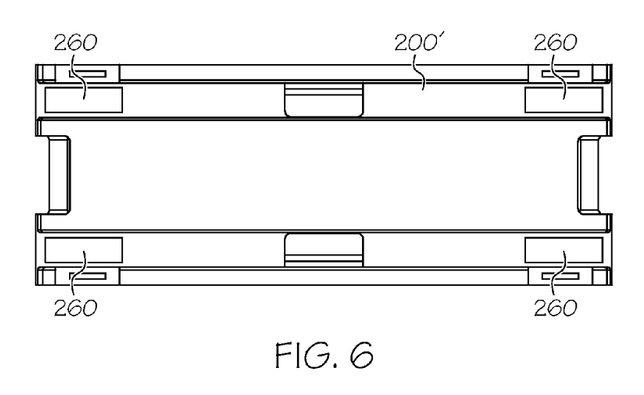
Figure 7:
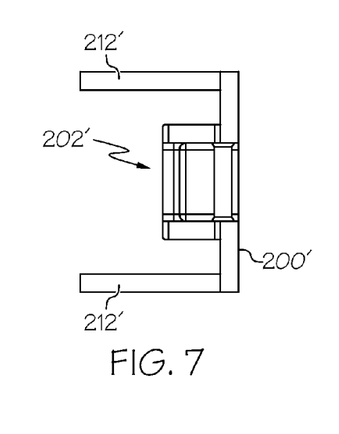
Figure 8:
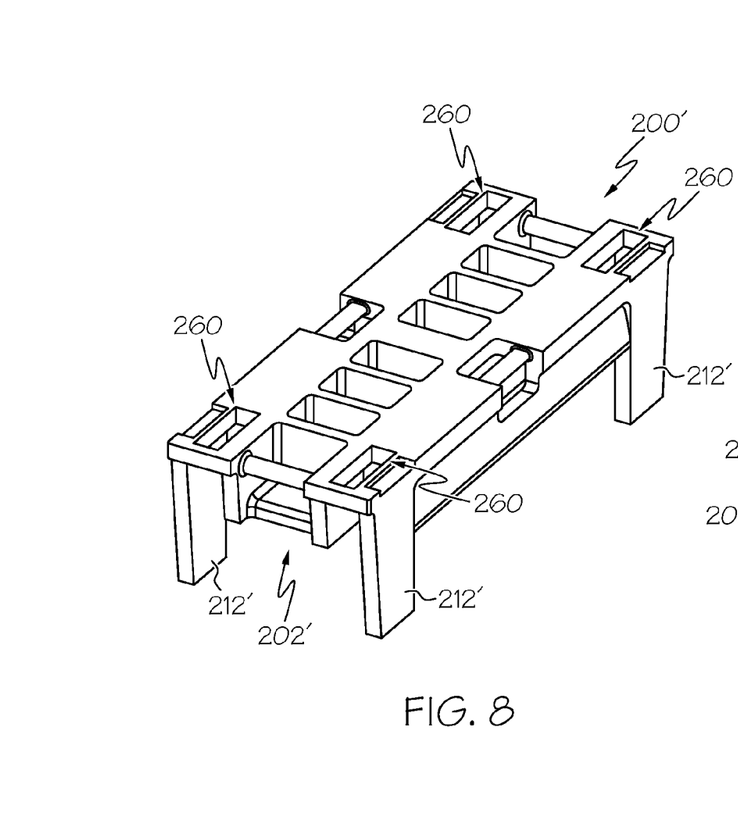

For engaging a pallet, such as the pallet 200, the deck 204 is placed in a lowered position on the cart 206 as shown in FIG. 2 so that the deck 204 can be moved into the pallet 200. Once inserted into a pallet, the pallet can be raised by elevating the cantilevered deck 204 as shown in FIG. 3. A pallet can be raised to a sufficient height to elevate legs 212 of the pallet 200 to clear the surface the cart 206 is supported upon so that the legs 212 will not interfere with movement of the pallet from one location to another in a facility using the cart and pallet system. The deck 204 can also be raised substantially higher for example to support products while they are placed on shelves for display. Currently it is planned to raise the deck 204 to a height of around 24 inches to provide ergonomic benefits for operators using the improved cart and pallet system of the present application. However, it is noted that any reasonable height of elevation can be accommodated in accordance with the teachings of the present application.

The pallet truck or cart 206 comprises a frame 230 supported upon a plurality of wheels, three pairs of wheels 232, 234, 236 as illustrated, and has a front 238 and a rear 240. A control housing 242 extends upwardly from the rear 240 of the frame 230. A mast assembly 244 comprises a lower portion 244A mounted within a forward portion of the control housing 242 and an upper portion 244B that extends above the control housing 242. The deck 204 is shaped to receive the corresponding pallet 200 as disclosed and described herein, with the deck 204 being cantilever and moveably supported by the mast assembly 244 and extending over the frame 230 from the mast assembly 244 to the front 238 of the frame 230 of the cart 206.

A pair of generally L-shaped control handles 246 extends upward in a generally vertical orientation from a rear of the control housing 242 and then extends forward in a generally horizontal orientation to the mast assembly 244, one handle on either side of the cart 206. The longer leg of the L-shaped control handles 246 extends vertically and the shorter leg of the L-shaped control handles 246 extends horizontally. A control bar 248 extends between the control handles 246 and a deck lift/lower control housing 250 is associated with the control bar 248, centered on the control bar 248 as shown in FIG. 2. The control bar 248 is mounted toward or at the top of the control handles 246 which reduces the effort required by an operator using the cart and pallet system of the present application. As illustrated, the control bar 248 is associated with the horizontally extending portions of the control handles 246 and can be mounted to the control handles 246 if desired.

At least one brake control 252 is associated with at least one of the control handles 246, two brake control handles, one associated with each of the control handles 246, are shown in FIG. 2. The brake control or controls can be used to operate any one of a variety of known brake mechanisms which can be associated with one or more of the pairs of wheels 232, 234, 236, if needed, to provide adequate braking of the cart 206. As illustrated, the front of the deck 204 is angled to facilitate entry into a corresponding pallet, such as the pallet 200. The angled front of the deck 204 is also beneficial when the cart 206 is used on surfaces having mismatched heights for example as may be encountered on loading docks when working in semitrailers and the like. The deck 204 is raised and lowered by a single hydraulic cylinder 254 mounted within the control housing 242. The control housing 242 defines one or more storage compartments 256 for work items and/or items personal to the operator of the cart 206. Powered traction assist is contemplated for the cart 206 with drive being applied preferably to the center pair of wheels 234. It is currently believed that necessary traction assist equipment can be accommodated within the housing 242.

Figure 9:
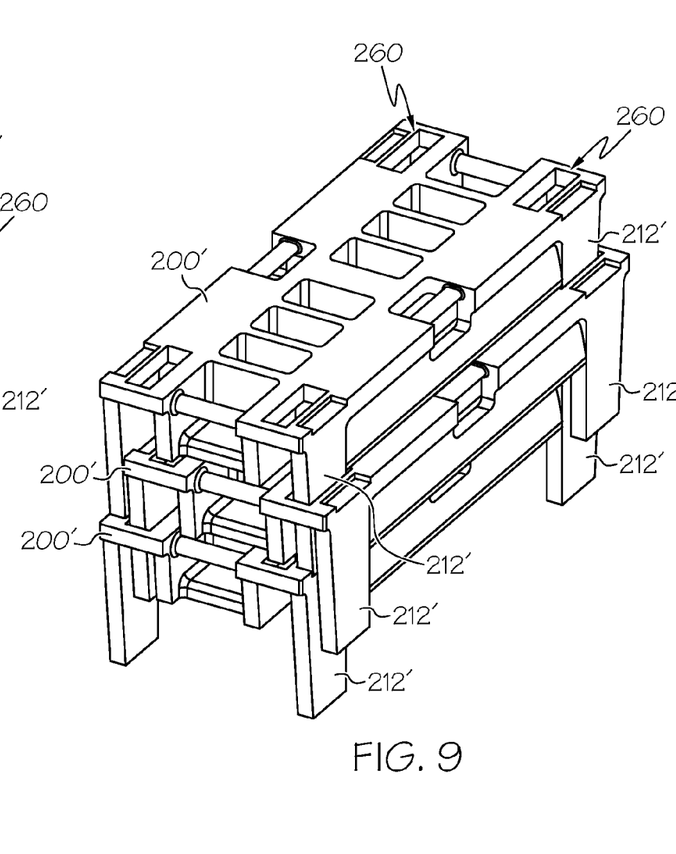

Reference will now be made to FIGS. 4-9 which illustrate a preferred design for a pallet 200' for use with the cart 206 of the present application. The pallet 200' provides a higher product support surface than conventional wooden pallets, such as the pallet 102, which is ergonomically beneficial for operators using the improved cart and pallet system of the present application. The pallet design shown in FIGS. 4-9 also provides improved stacking abilities in comparison to existing pallets which can be used with the cart 206. More particularly, as shown in FIG. 9, pallets 200' can be compactly stacked in a staggered side-to-side pattern. In addition to apertures or openings formed in the pallet 200' to reduce weight, openings 260 enable the legs 212' of a pallet 200' to enter and extend through and below the upper surface of a pallet 200' upon which it is to be stacked. While three (3) stacked pallets 200' are shown in FIG. 9, any reasonable number of pallets 200' can be stacked to any corresponding reasonable height.

Figure 10A:
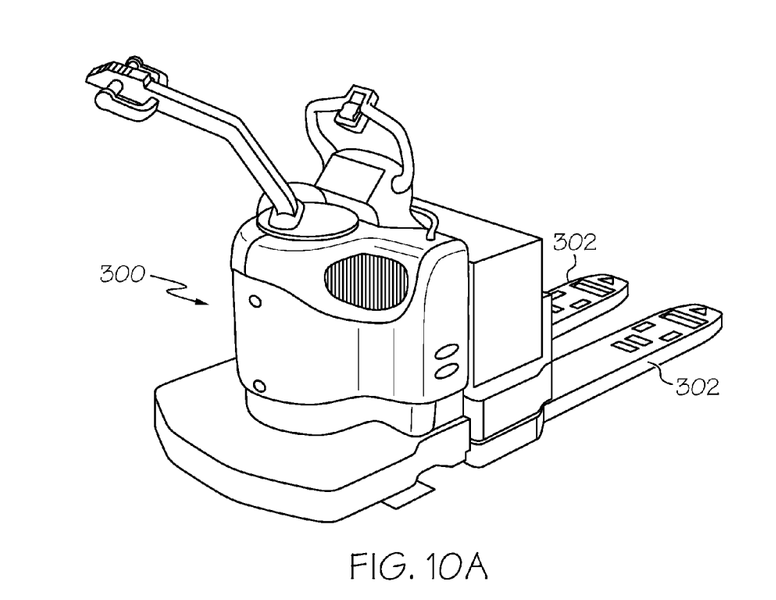
FIGS. 10A-10C illustrate a Crown Equipment Corporation PE truck having a widened fork which can be used to carry two of the pallets illustrated in FIGS. 4-9.
Figure 10B:
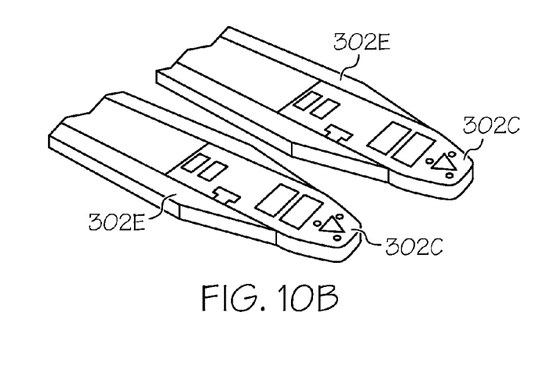
Figure 10C:
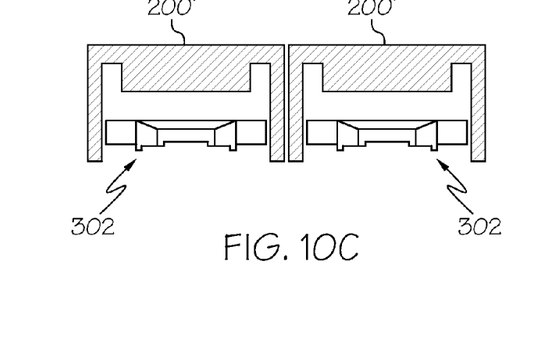

In addition to the ability to stack the pallets 200' as illustrated, the pallets 200' can also be carried by appropriately equipped pallet trucks having widened but otherwise conventional forks, comparable to the forks 104 of FIG. 1. Referring to FIGS. 10A-10C, a Crown PE truck 300 having a wider fork 302 than conventionally provided, best shown in FIG. 10B where sideward extensions 302E are added to a conventional fork 302C, can be used to carry two pallets 200' as shown in FIG. 10C.

Figure 11:
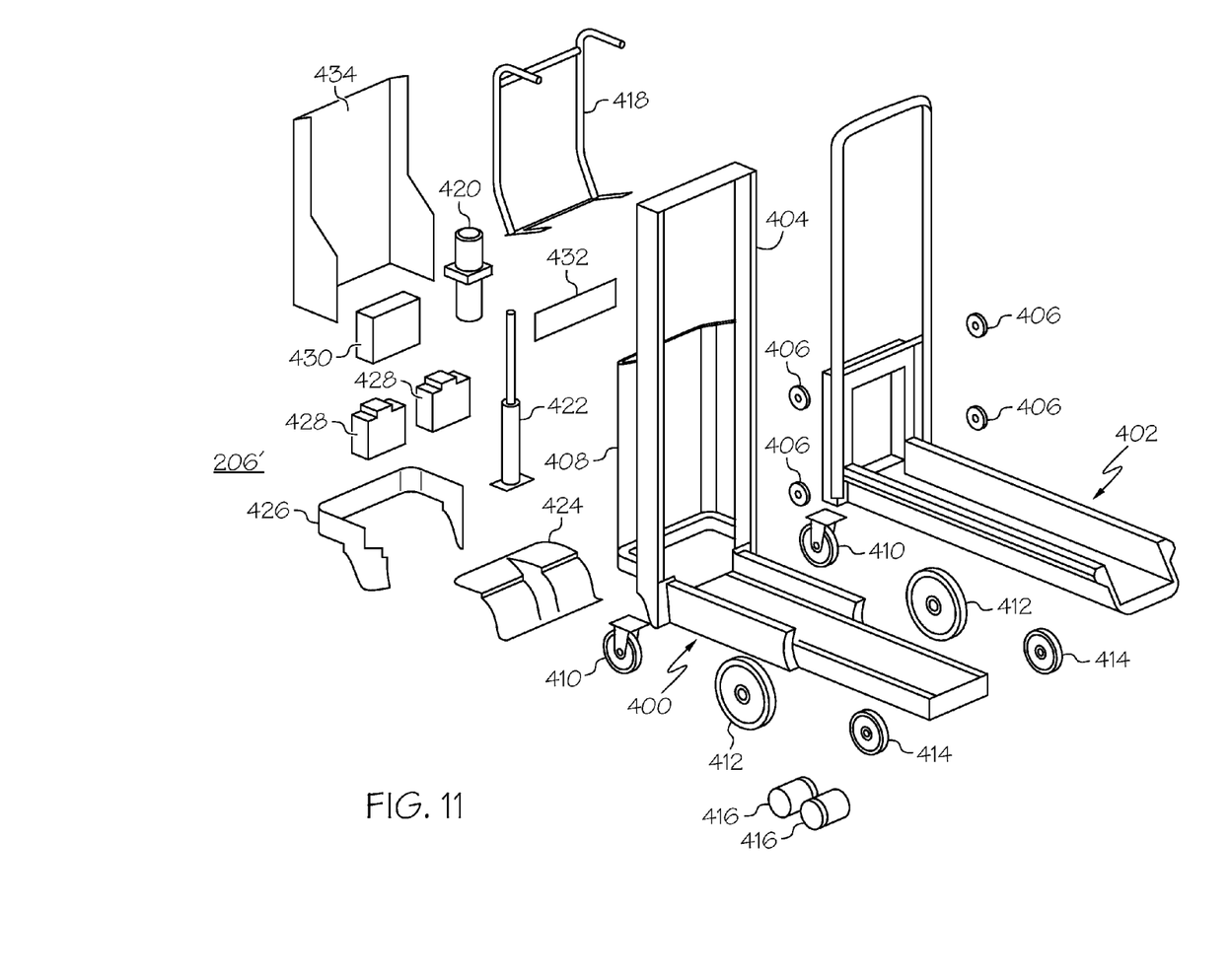
FIG. 11 is an exploded view of a contemplated embodiment of a pallet truck or cart in accordance with the teachings of the present application.

Reference will now be made to FIG. 11 which is an exploded view of a contemplated embodiment of a cart 206' in accordance with the teachings of the present application. Components of the cart 206' are identified as follows:

400—chassis frame
402—deck (carriage weldment)
404—chassis weldment
406—mast column rollers
408—housing frame
410—caster wheels
412—center wheels
414—front wheels
416—motors for traction assist
418—control handles (grab bar)
420—hydraulic unit (motor and pump)
422—hydraulic cylinder
424—support plate
426—skirt
428—batteries
430—electronics/charger
432—support
434—housing cover

The invention claimed is:

1. A pallet truck comprising:
a frame supported upon a plurality of wheels and having a front and a rear, the frame comprising a chassis weldment;
a control housing extending upwardly from the rear of the frame;
a mast assembly comprising a lower portion that is mounted within a forward portion of the control housing and an upper portion extending above the control housing;
a deck shaped to receive a corresponding pallet, the deck being cantilever and moveably supported from the mast assembly and extending over the frame from the mast assembly to the front of the frame;
a pair of generally L-shaped control handles extending generally vertically upward from a rear of the control housing and then generally horizontally toward the mast assembly, one control handle located on either side of the pallet truck, wherein a lower end of each of the control handles is connected to the control housing and an upper end of each of the control handles is connected to the chassis weldment of the frame; and
a control bar extending between the control handles, wherein the control bar is mounted at the upper end of the control handles.

2. The pallet truck as claimed in claim 1, wherein each control handle comprises a longer leg that extends vertically upward from the rear of the control housing and a shorter leg that extends generally horizontally toward the mast assembly.

3. The pallet truck as claimed in claim 1, further comprising a deck lift and lower control housing coupled to the control bar, wherein the deck lift and lower control housing is centered on the control bar.

4. The pallet truck as claimed in claim 1, further comprising a brake control mounted in at least one of the control handles, wherein the brake control extends vertically along at least a portion of the at least one of the control handles.

5. The pallet truck as claimed in claim 1, wherein the control bar is mounted in and extends between portions of the control handles extending generally horizontally toward the mast assembly.

6. The pallet truck as claimed in claim 1, wherein the deck has a rear and a front, with at least a portion of the front of the deck being angled toward the rear of the deck to facilitate entry into the corresponding pallet.

7. The pallet truck as claimed in claim 1, wherein the deck is raised and lowered by a single hydraulic cylinder mounted within the control housing.

8. The pallet truck as claimed in claim 1, wherein an upper portion of the control housing defines one or more storage compartments for work items and items personal to an operator.

9. The pallet truck as claimed in claim 1, wherein the deck is generally U-shaped and the corresponding pallet includes a central support extending beneath the corresponding pallet sized to be received within the U-shaped deck.

10. The pallet truck as claimed in claim 9, wherein the U-shaped deck has ledges extending outwardly along upper edges of the U-shaped deck and the corresponding pallet defines channels that extend on either side of the central support, wherein the ledges of the U-shaped deck are received within the channels of the corresponding pallet.

11. The pallet truck as claimed in claim 1, wherein the plurality of wheels comprises a front pair of wheels, a center pair of wheels, and a rear pair of wheels, the center pair of wheels comprising a larger diameter than the front and rear pairs of wheels.

12. A pallet truck comprising:
a frame supported upon a plurality of wheels and having a front and a rear, the frame comprising a chassis weldment;
a control housing extending upwardly from the rear of the frame;
a mast assembly comprising a lower portion that is mounted within a forward portion of the control housing and an upper portion extending above the control housing;
a deck shaped to receive a corresponding pallet, the deck being cantilever and moveably supported from the mast assembly and extending over the frame from the mast assembly to the front of the frame;
a pair of generally L-shaped control handles extending generally vertically upward from a rear of the control housing and then generally horizontally toward the mast assembly, one control handle located on either side of the pallet truck, wherein a lower end of each of the control handles is connected to the control housing and an upper end of each of the control handles is connected to the chassis weldment of the frame;
a control bar extending between the control handles, wherein the control bar is mounted at the upper end of the control handles;
a deck lift and lower control housing coupled to the control bar, wherein the deck lift and lower control housing is centered on the control bar; and
a brake control mounted in at least one of the control handles, wherein the brake control extends vertically along at least a portion of the at least one of the control handles.

13. The pallet truck as claimed in claim 12, wherein the plurality of wheels comprises a front pair of wheels, a center pair of wheels, and a rear pair of wheels, the center pair of wheels comprising a larger diameter than the front and rear pairs of wheels.

* * * * *